Oct. 2, 1923.
J. A. BRYDEN
LIQUID DISPENSING APPARATUS
Filed Dec. 20, 1920
1,469,617
7 Sheets-Sheet 1
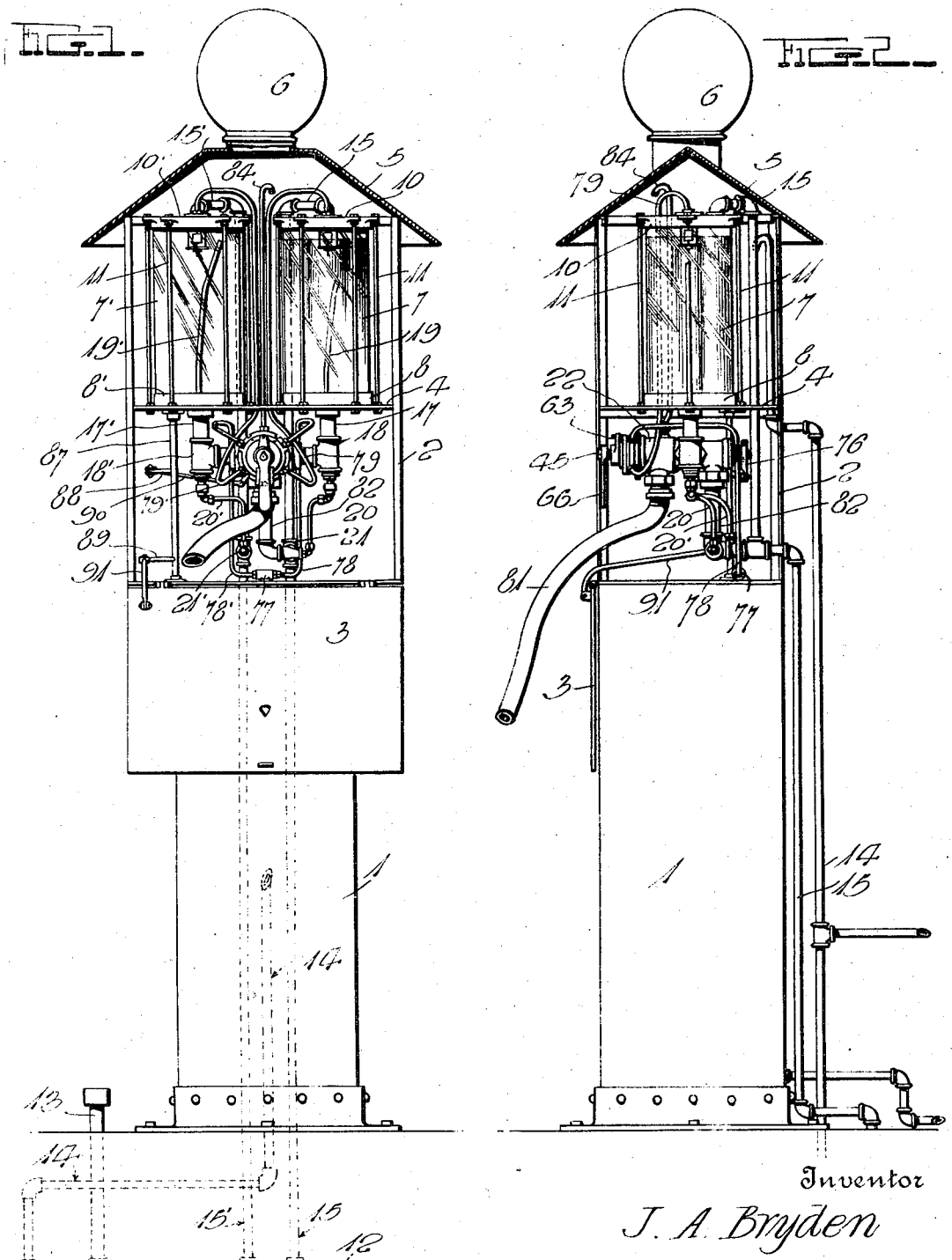
Inventor
J. A. Bryden
Witness
H. Woodard
By H. B. Wilson &co
Attorneys

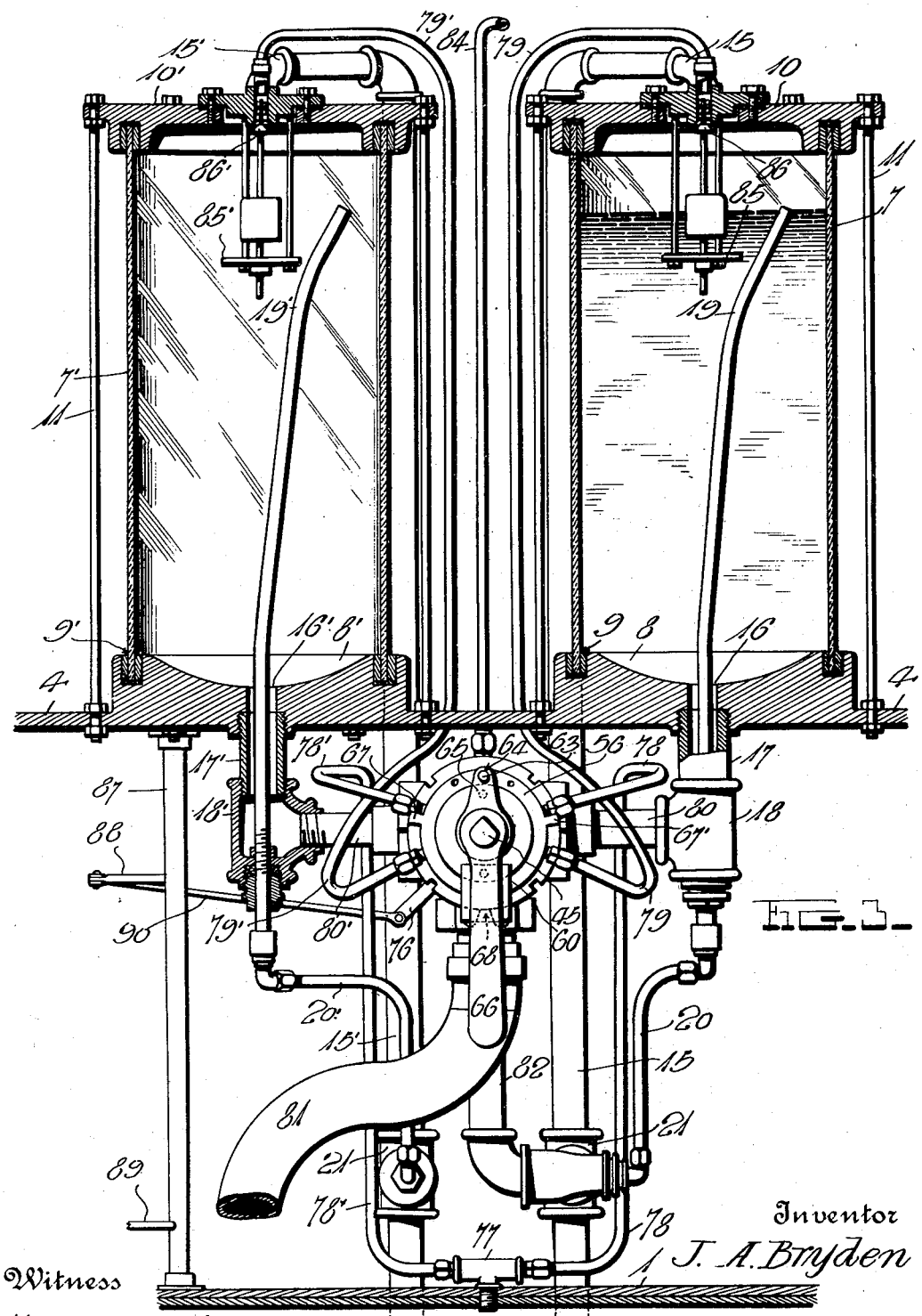

Oct. 2, 1923.　　　　　　　　　　　　　　　　1,469,617
J. A. BRYDEN
LIQUID DISPENSING APPARATUS
Filed Dec. 20, 1920　　　7 Sheets-Sheet 3
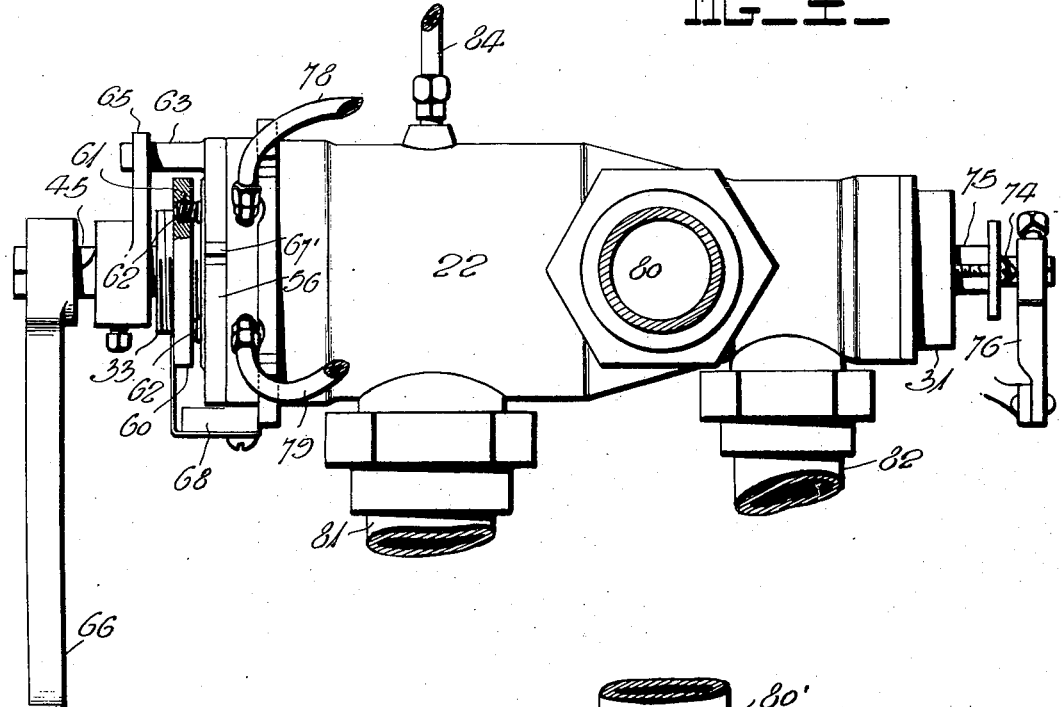
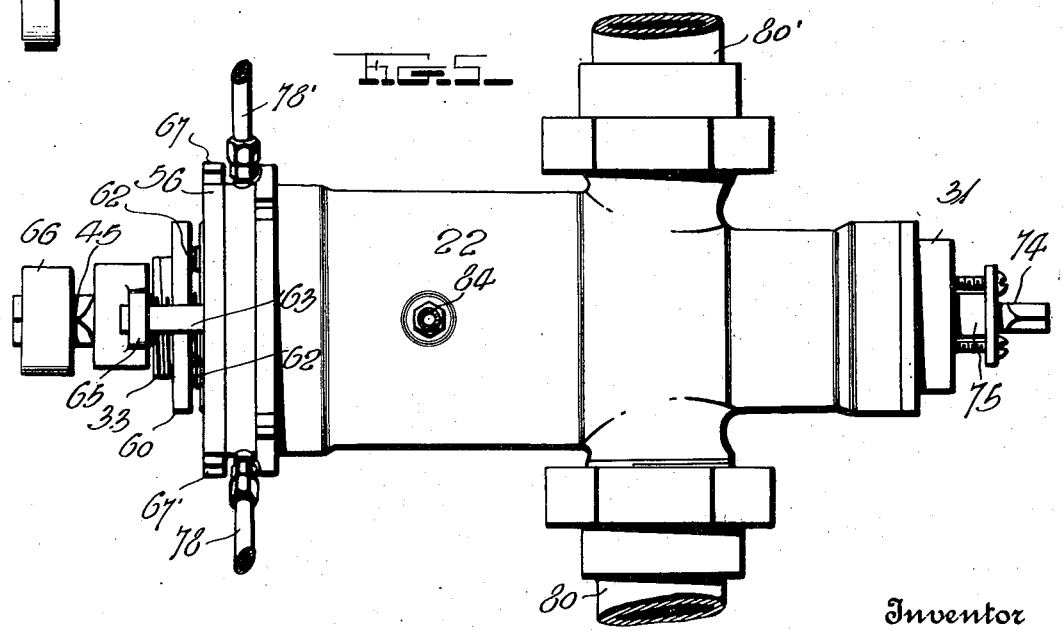
Witness
H. Woodard
Inventor
J. A. Bryden
By H. R. Wilson & Co.
Attorneys

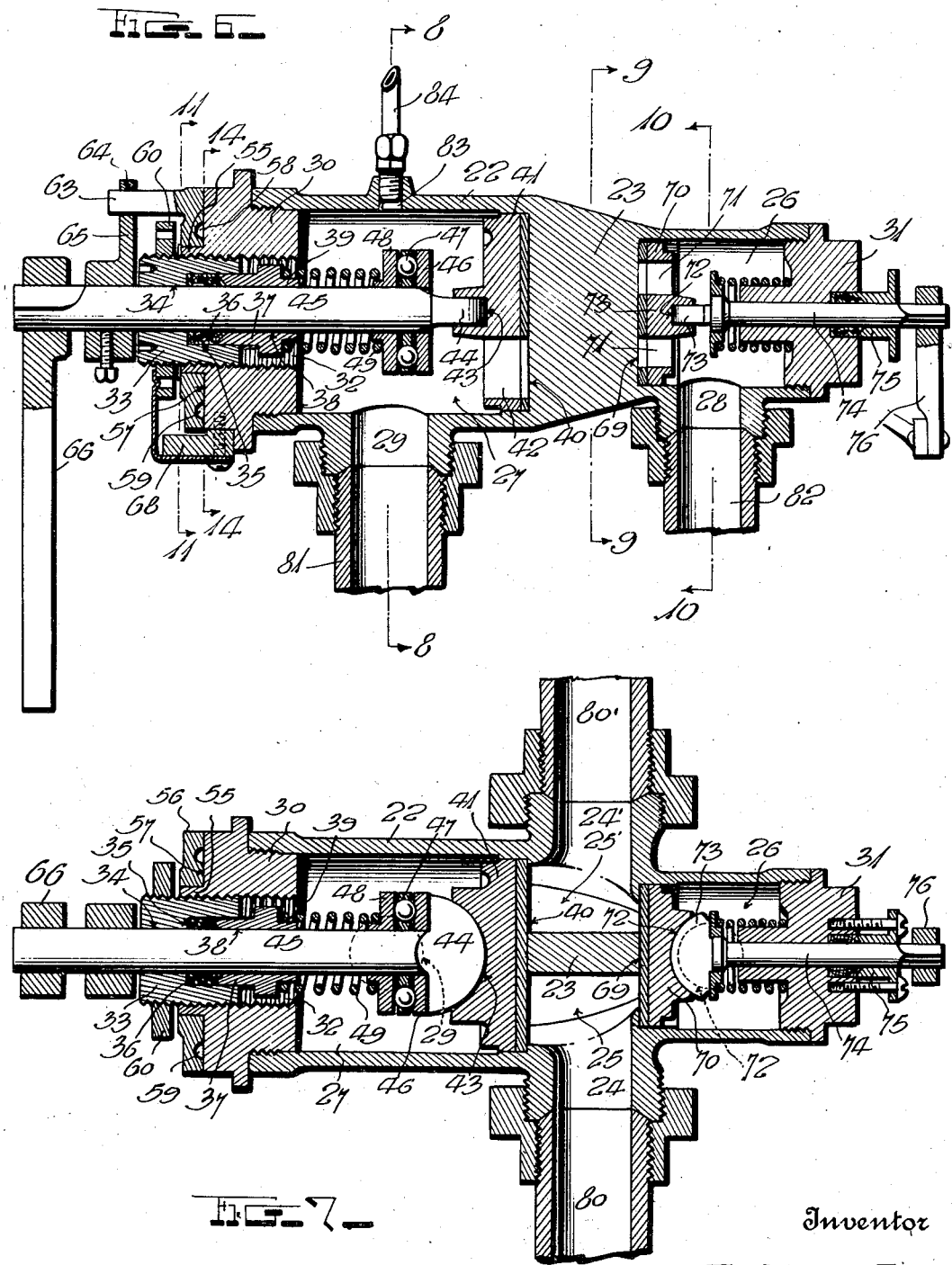

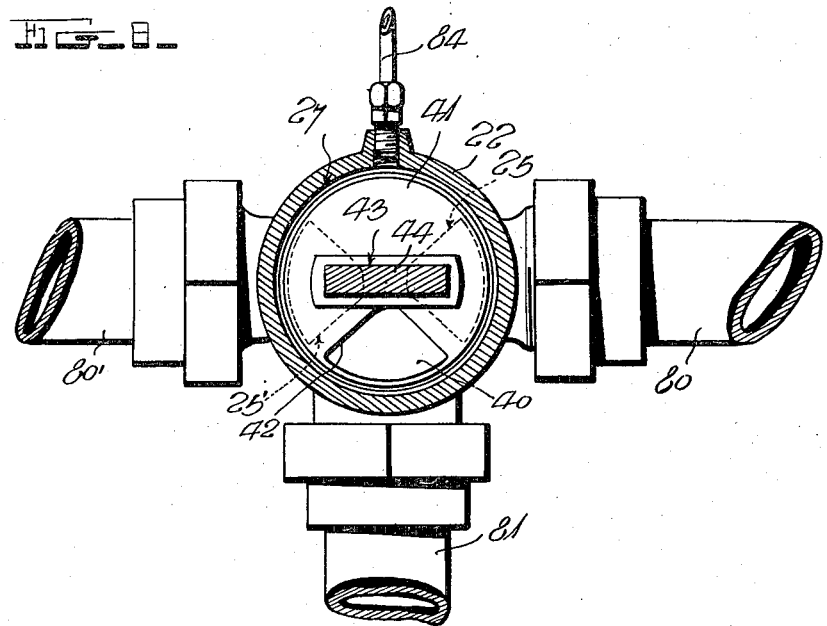
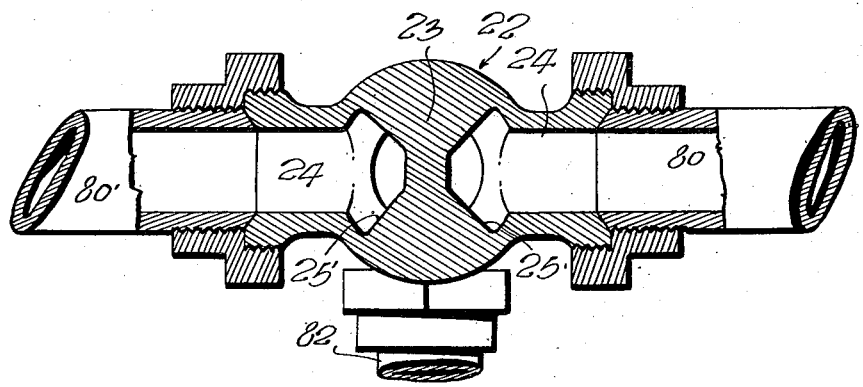
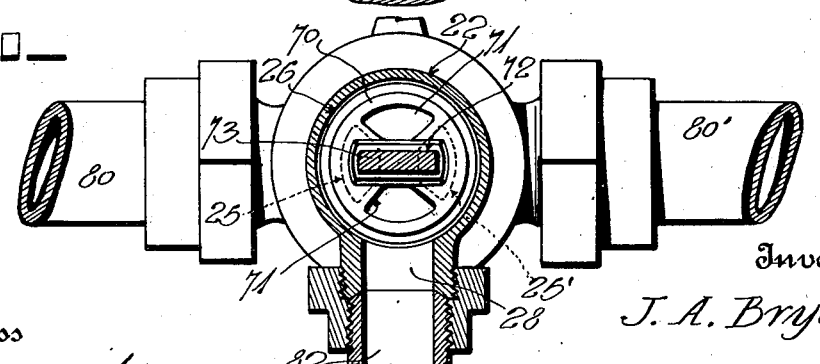

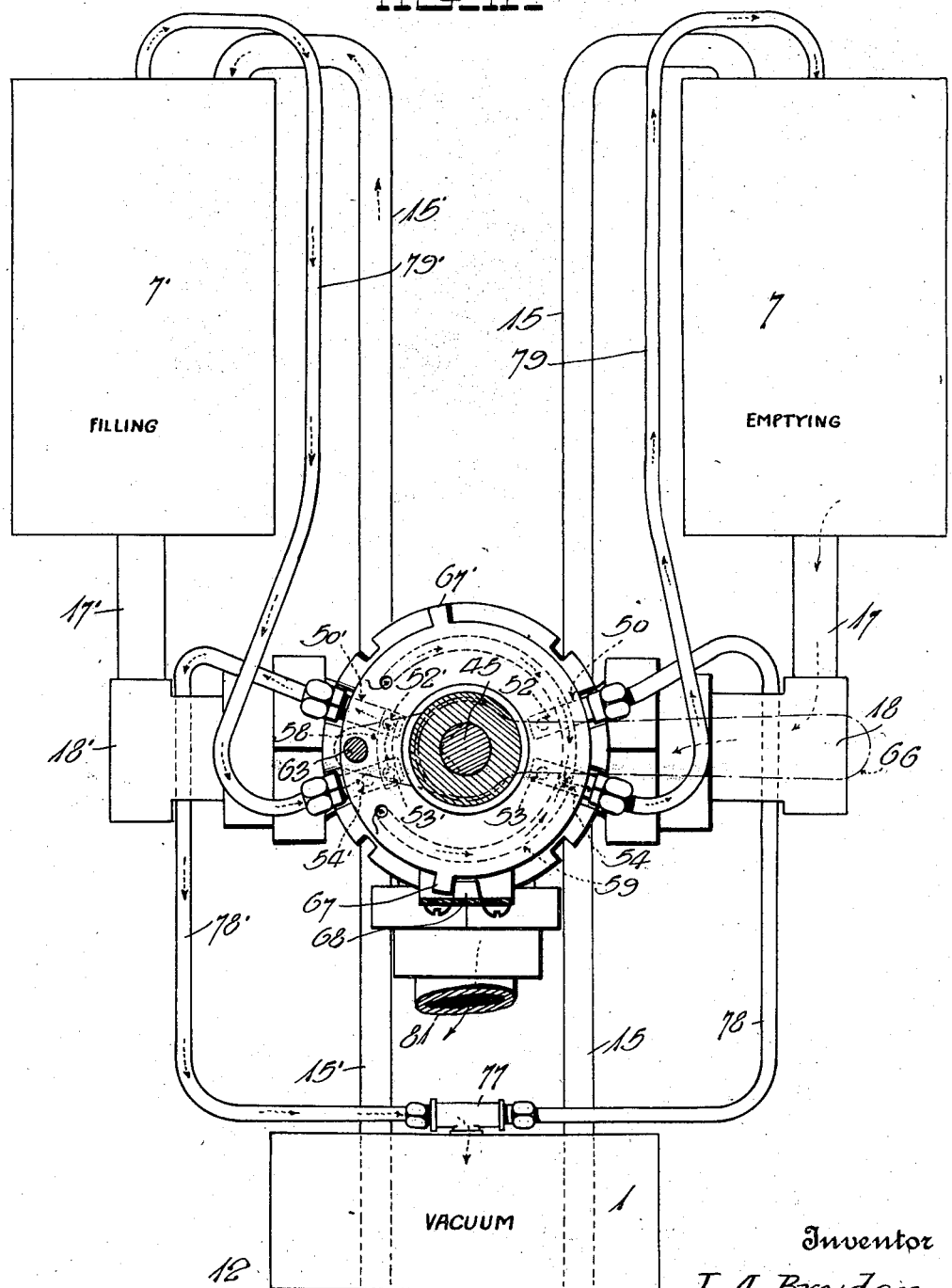

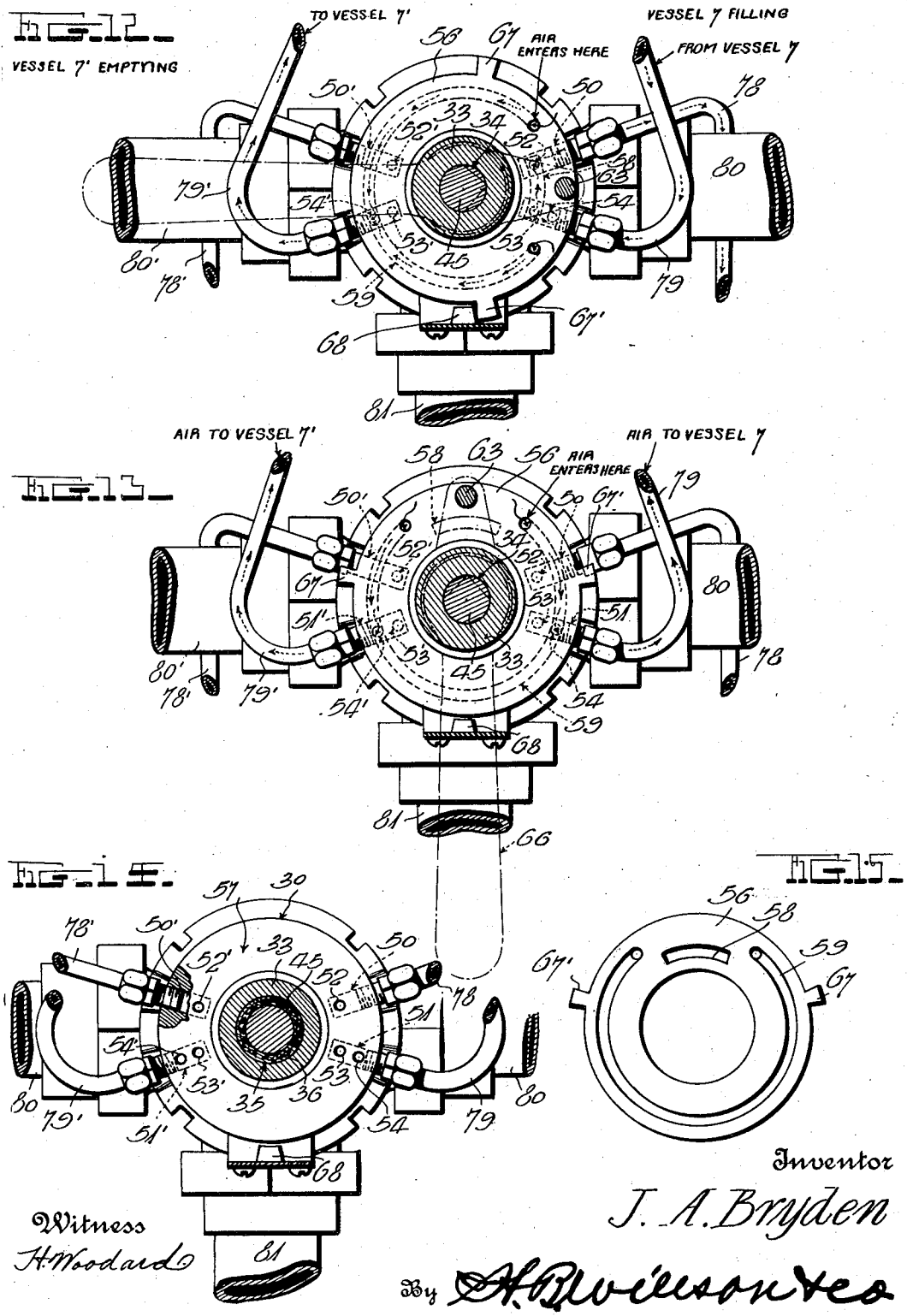

Patented Oct. 2, 1923.

1,469,617

UNITED STATES PATENT OFFICE.

JOHN A. BRYDEN, OF SPRINGFIELD, ILLINOIS, ASSIGNOR OF ONE-THIRD TO URIAH R. McCUTCHEN AND ONE-THIRD TO JAMES A. HALL, BOTH OF SPRINGFIELD, ILLINOIS.

LIQUID-DISPENSING APPARATUS.

Application filed December 20, 1920. Serial No. 431,961.

*To all whom it may concern:*

Be it known that I, JOHN A. BRYDEN, a citizen of the United States, residing at Springfield, in the county of Sangamon and State of Illinois, have invented certain new and useful Improvements in Liquid-Dispensing Apparatus; and I do declare the following to be a full, clear, and exact description of the invention, such as will enable others skilled in the art to which it appertains to make and use the same.

The present invention relates to liquid dispensing apparatus and is especially adapted for dispensing gasoline in a gasoline filling station for motor vehicles, although it may be used to advantage for other purposes.

Briefly stated, the invention includes an underground storage tank, a pair of visible measuring vessels supported above the ground, means for causing liquid to flow from the storage tank to the measuring vessels, and valve mechanism whereby one of the measuring vessels is caused to empty while the aforesaid means is caused to operate to fill the other measuring vessel, this valve mechanism also serving to prevent both measuring vessels from being emptied at the same time and to prevent the aforesaid means from operating to fill both measuring vessels at the same time. The valve mechanism is therefore a very important feature of the invention, this being especially true because it consists of various valves connected to operate in unison and all mounted in and upon a single casing. Furthermore, the valve mechanism is constructed so that the possibility of leakage is reduced to a minimum.

Another important feature of the invention is the provision of means whereby the liquid may be measured with a high degree of accuracy, the means for accomplishing this result not being susceptible to variation caused by wearing of the parts of the mechanism or the like.

A further important feature of the invention is the provision of a housing inclosing the principal parts of the apparatus and drainage means operatively connected to the door of the housing whereby the contents of both measuring vessels will be caused to drain back into the storage tank automatically upon the closing of the door.

The invention consists of the novel features of construction, and the combination and arangement of parts hereinafter described and claimed.

The descriptive matter of the following specification is supplemented by the accompanying drawings, in which:

Figure 1 is a front view of an apparatus constructed in accordance with the invention;

Figure 2 is a side elevation of the apparatus, a portion of the housing being removed;

Figure 3 is an enlarged front view, partly in section of the principal portion of the apparatus;

Figure 4 is a side elevation of the valve mechanism;

Figure 5 is a top plan view of the valve mechanism;

Figure 6 is a central vertical longitudinal sectional view of the valve mechanism;

Figure 7 is a central horizontal longitudinal sectional view of the same;

Figures 8, 9 and 10 are transverse sectional views taken respectively on the planes indicated by the lines 8—8, 9—9 and 10—10 of Fig. 6 and looking in the direction of the arrows;

Figure 11 is a transverse sectional view taken on the plane indicated by the line 11—11 of Fig. 6, the measuring vessels and piping being diagrammatically illustrated and the vavle mechanism being shown in the position which it would occupy when the right hand measuring vessel is emptying and the left hand vessel is being filled;

Figure 12 is a view somewhat similar to Fig. 11 illustrating the position of the valve mechanism when the left hand measuring vessel is emptying and the right hand vessel is being filled;

Figure 13 is a similar view illustrating the valve mechanism in its neutral or intermediate position;

Figure 14 is a transverse sectional view of the valve mechanism taken on the plane as indicated by the line 14—14 of Fig. 6; and Figure 15 is a view of the inner face of the exterior valve plate.

In the drawings above briefly described, similar reference numerals are used to designate similar parts of the apparatus throughout all of the views, and since the apparatus, includes a right hand measuring vessel and a left hand measuring vessel, the parts of the mechanism connected to or associated with the left hand vessel are indicated by the primes of the numerals which are used to indicate the corresponding parts connected to or associated with the right hand vessel.

Referring more particularly to the drawings, the numeral 1 designates a cylindrical vacuum tank which is supported in an upright position upon the surface of the ground or upon any other suitable support. This tank 1 forms the supporting standard for a housing 2 provided at its front side with a hinged door 3, and for a platform 4 having disposed thereabove in spaced relation thereto a roof 5, which preferably forms the support for a suitable light 6.

Supported upon the platform 4 is a right hand measuring vessel 7 and a left hand measuring vessel 7', both of which are made of glass cylinders so that their contents may be easily observed. While the exact construction of the measuring vessels and the manner in which they are mounted upon the platform 4 forms no part of the present invention, yet it will be stated that the platform 4 is provided with a pair of upstanding bosses 8 and 8' provided respectively with seats 9 and 9' for receiving the lower ends of the vessels 7 and 7' respectively, that heads 10 and 10' are seated upon the upper ends of the vessels 7 and 7' respectively to form the upper ends of the vessels and that these heads are clamped to the platform 4 by means of a number of bolts 11.

Submerged in the ground preferably directly below the vacuum tank 1 and the mechanism supported thereby is a gasoline storage tank 12. This tank 12 may be filled and refilled through a pipe 13 which leads from the tank to a point above the ground, and in order to permit air to enter the tank 12, a pipe 14 is led from the tank upwardly back of the vacuum tank 1 into the housing 2 and upwardly back of the measuring vessels 7 and 7' to terminate directly below the roof 5. The upper end of this pipe 14 is left open. The measuring vessels 7 and 7' are supplied with gasoline from the storage tank 12 by means of supply pipes 15 and 15' respectively, which, as will be seen, pass upwardly from the tank 12 back of the vacuum tank 1 into the housing 2 and then upwardly behind the measuring vessels and thence lead into the same, being connected by suitable unions to the heads 10 and 10'.

The bosses 8 and 8' are provided with central openings 16 and 16' merging at their lower ends into necks to which are connected short nipples 17 and 17' respectively, which in turn are connected to T-shaped castings 18 and 18'. Threaded to one of the necks of the castings 18 and 18' so as to be adjustable longitudinally with respect to said castings are pipes 19 and 19' respectively. These pipes 19 and 19' extend upwardly through the castings 18 and 18', the nipples 17 and 17', the openings 16 and 16' and into the vessels 7 and 7' respectively, and terminate predetermined distances below the heads 10 and 10'. The longitudinal adjustment of the pipes 19 and 19' is such that they serve to carry out of the vessels all gasoline allowed to pass therein in excess of a predetermined or measured amount, for instance, five gallons. The lower ends of the pipes 19 and 19' extend below the castings 18 and 18' respectively, and are connected in any suitable manner to short pipes 20 and 20' respectively, which in turn are connected to suitable unions 21 and 21' respectively arranged in the supply pipes 15 and 15' respectively. It will thus be seen that the overflow from the measuring vessels passes from the overflow pipes 19 and 19' to the supply pipes 15 and 15' respectively and thence through the latter back into the storage tank 12.

The valve mechanism of the apparatus is mounted in and upon a single casing 22 which is provided intermediate of its ends with a partition 23 cast integral therewith, and at points adjacent said partition and on diametrically opposite sides of the casing with induction openings 24 and 24'. These openings 24 and 24' lead respectively into passages 25 and 25' which extend longitudinally through the partition 23 and communicate with the chambers 26 and 27 formed in the casing by said partition. The casing 22 is provided with an eduction opening 28 leading into the chamber 26 and with an eduction opening 29 leading into the chamber 27.

The ends of the body of the casing 22 are internally threaded and the end adjacent the chamber 27 receives a plug 30, while the end adjacent the chamber 26 receives a plug 31.

The plug 30 is provided with a central longitudinally extending internally threaded opening 32 in which is threaded for longitudinal adjustment a smaller plug 33 having a central longitudinally extending opening 34 therein which merges at its inner end into a recess 35 for receiving packing material 36 and the inner end of a packing box gland 37. This gland 37 is provided with a longitudinally extending central opening 38 aligned with the opening 34 and with an annular shoulder 39 on its outer end.

The end of the partition 23 adjacent the chamber 27 is finished or machined to form a valve seat 40. Turnably mounted in the chamber 27 and seated flat against the valve seat 40 is a valve head in the form of a plate 41. This plate 41 is provided with an eccentrically located opening or passage 42 designed to establish communication between either one of the passages 25 or 25' and the interior of the chamber 27 and consequently with the eduction opening 29 when positioned in registering relation with said passages 25 or 25'.

The unseated side of the valve plate 41 is provided with a concave recess 43, two opposite walls of which are arranged in parallel relation. This recess 43 receives the head 44 of a stem 45 which extends snugly through the aforesaid openings 38 and 34, being turnably and slidably mounted therein, to the exterior of the valve casing. The head 44 of the stem has two parallel opposite sides adapted to fit between the parallel walls of the recess 43, and its end configuration is shaped to correspond to the concavity of the recess 43 so that the plate 41 will be at all times seated against the valve seat 40 irrespective of variations in the direction which the stem 45 extends.

The inner end of the stem 45 adjacent its head 44 carries a disk 46 which forms a thrust bearing for a ball race 47 turnably mounted upon the stem 45 and against which bears a disk or sleeve 48 turnably mounted upon the stem 45. Interposed between the disk 48 and the collar 39 carried by the gland 37 is a coiled spring 49. This coiled spring acts so as to maintain the valve plate 41 seated more or less tightly against the valve seat 40.

A portion of the plug 30 extends beyond the adjacent end of the body of the casing 22 and arranged in this portion of the plug are two sets of companion ports or recesses 50 and 51 and 50' and 51', the ports 50 and 51 constituting one set and being disposed at one side of the plug while the ports 50' and 51' constitute the other set and are disposed at the diametrically opposite side of the plug. The ports extend radially into the plug and the ports 50 and 50' are provided with orfices 52 and 52' respectively which lead longitudinally outwardly. The ports 51 and 51' are provided with orfices 53 and 53' respectively and 54 and 54', all of which extend longitudinally outwardly. The orifices 52, 52', 53 and 53' are all equal distances from the central longitudinal axis of the valve mechanism, while the orifices 54 and 54' are spaced radially outwardly away from the orifices 53 and 53' but are equal distances from the central longitudinal axis of the valve mechanism. The ports or recesses 50, 50', 51 and 51' are internally threaded or otherwise suitably adapted to receive pipes.

Formed on the outer side of the plug 30 and extending outwardly therefrom is an annular flange 55, upon which is turnably mounted a valve plate 56. The outer side of the plug 30 is finished or machined to form a valve seat 57 for this valve plate 56. The inner side or face of this valve plate 56 is finished or machined so that it will fit absolutely flat against the valve seat 57 and it is provided with a short arcuate passage 58 and a comparatively long arcuate passage 59, the ends of which merge into vent openings. The passage 58 has its curve centered at a point co-incident with the axis of the valve mechanism and is spaced radially from said axis the same distace that the orifices 52, 52', 53 and 53' are spaced from this axis. The passage 59 has its curve centered upon the same axis and it is spaced radially from the latter the same distance that the orifices 54 and 54' are spaced therefrom. This arrangement is such that the plate 56 may be positioned so as to cause the passage 58 to register with the orifices 52, 52', 53 and 53' and so as to cause the passage 59 to register with the orifices 54 and 54'.

A portion of the plug 33 extends beyond the plug 30 and the flange 55, and threaded upon this portion of the plug 33 so as to be adjustable longitudinally thereon is a collar 60, the inner side of which is provided with a series of recesses 61 in which are seated coiled springs 62 which bear against the outer side of the valve plate 56 and maintain the latter seated against the valve seat 57.

Projecting outwardly from the outer side of the valve plate 56 and located eccentrically with respect to the longitudinal axis of the valve mechanism is an extension or other suitable member 63, which extends slidably through an opening 64 formed in the outer end of an arm 65 which in turn is fixed upon the stem 45 and extends radially therefrom. By this construction, it will be seen that whenever the stem 45 is turned, a corresponding movement will be imparted to the valve plate 56, and since the valve plate 56 is mounted so that it can yield and also since the valve plate 41 and the stem 45 may yield longitudinally, the coupling of the valve plate 56 with the stem 45 through the medium of the extension 63 and arm 65 will permit this yielding.

In order to operate the stem 45 a handle 66 is fitted upon its outer end, and in order to limit the movement of the mechanism so far described, the valve plate 56 is provided with laterally extending lugs 67 and 67' adapted to engage the opposite sides of a forwardly projecting stop 68 carried by the plug 30.

The side of the partition 23 adjacent the chamber 26 is finished or machined so as to form a valve seat 69 against which bears a valve head or plate 70, which is turnably mounted in the chamber 26. This valve plate 70 is provided with a pair of oppositely disposed eccentric passages or openings 71 positioned so as to register with the passages 25 and 25', and on its outer side with a recess 72 similar to the recess 43 of the valve plate 41. This recess 72 is adapted to receive the head 73 of a stem 74 which extends centrally through a central longitudinal opening in the plug 31. The head 73 is constructed similar to the head 44 of the stem 45. If desired, the plug 31 may be provided with a packing box 75. As shown, the outer end of the stem 74 projects beyond the outer side of the plug 31 and its packing box 75 and has fitted thereto an arm 76.

Connected to the top of the vacuum tank 1 is a T-coupling 77 to which are coupled pipes 78 and 78' leading to and connected to the ports 50 and 50' respectively. Connected to and leading from the ports 51 and 51' are what may be termed combined vacuum and vent pipes 79 and 79' respectively, which in turn lead to and are connected to the upper ends or heads of the vessels 7 and 7' respectively. The induction openings 24 and 24' of the valve casing 22 are connected by means of short nipples 80 and 80' respectively to the castings 18 and 18' respectively, and the eduction opening 29 of the chamber 27 has a delivery hose 81 connected thereto, while the eduction opening 28 of the chamber 26 has a pipe 82 connected thereto, which pipe 82 extends and is connected to the coupling 21 so that it communicates with the supply pipe 15.

In order to vent the chamber 27 the body of the valve casing 22 is provided with an opening 83 in which is fitted the lower end of a vent pipe 84, the upper end of which terminates at a point a short distance below the roof 5. The upper end of this vent pipe 84 is left open.

Disposed within the measuring vessels 7 and 7', and secured to and depending from the heads 10 and 10' respectively, are guides 85 and 85' respectively, in which are mounted float valves 86 and 86' respectively for controlling the opening and closing of the pipes 79 and 79' respectively, into communication with their respective measuring vessels.

Revolubly mounted between the platform 4 and the bottom of the housing 2 is a rock shaft 87 carrying laterally extending arms 88 and 89. The upper arm 88 is pivotally connected to one end of a link 90, the other end of which is similarly connected to the free end of arm 76 carried by the valve stem 74. The free end of the arm 89 is pivotally connected to a link 91 which is in turn connected in a pivotal manner to the door 3. By this construction, whenever the door 3 is swung upon its hinge, a turning movement will be imparted to the valve plate 70.

The operation of the apparatus is as follows:—Assuming that the door 3 of the housing 2 is open as indicated in Figs. 1 and 2 of the drawings, the valve plate 70 will be disposed so that the passages 25 and 25' in the partition 23 are closed to communication with the chamber 26. Such position of the valve plate 70 is indicated in Figs. 6, 7 and 10 of the drawings. Further assuming that the handle 66 fitted upon the valve stem 45 is in the position shown in Figs. 1, 2, 3, 6, 7 and 13, which is the neutral or intermediate position of the handle and mechanism operable in unison therewith, the valve plate 41 will be positioned so that the passages 25 and 25' in the partition 23 will be closed by the valve plate 41 to communication with the chamber 27, as clearly shown in Figs. 6, 7 and 8. As clearly shown in Fig. 13, the valve plate 56 will be positioned so that portions of the passage 59 will register with both orifices 54 and 54'. In this position of the valve plate 56, the air entering the ends of the passage 59 will pass through the orifices 54 and 54', the ports 51 and 51', the pipes 79 and 79', and into the measuring vessels 7 and 7'. It must be further assumed that the right-hand measuring vessel 7 is filled with liquid up to the level of the upper end of the overflow pipe 19, and also that the float valves 86 and 86' are in open position.

With the foregoing position of the parts clearly in mind, should it be desired to dispense or deliver the contents of the vessel 7 by way of the delivery hose 81, it is only necessary to move the handle 66 to the right until the lug 67 carried by the valve plate 56 engages the left-hand edge of the stop 68. In so moving the handle 66 to the right, the stem 45 will be turned and a corresponding movement will be imparted to the valve plate 41. The valve plate 41 will now be positioned so that its passage or opening 42 will be disposed in registering relation with the passage 25 in the partition 23, and communication will thereby be established between the right-hand measuring vessel 7 and the delivery hose 81. Since the valve plate 56 is connected to the stem 45 so as to be operated in unison therewith and with the valve plate 41, when the handle 66 is moved to the right, the valve plate 56 will be turned so that the passage 58 will be brought into registering relation with the orifices 52' and 53', and so that the vented passage 59 will be brought into registering relation with the orifice 54. In this position of the valve plate 56, the air entering the passage 59 will pass through the orifice 54, the pipe 79 and into the measuring vessel 7. This vessel 7 being vented at the top and having its outlet at the bottom opened to communication with the delivery hose 81 will permit its contents to pass out of the same through the opening 16, nipple 17, casting 18, nipple 80, opening 24, passage 25, valve passage 42, chamber 27, opening 29 and through the delivery hose 81. At the same time, the right hand measuring vessel is emptying, the passage 58 establishes communication between the pipes 78' and 79' so that air will be exhausted from the measuring vessel 7' and as long as this occurs, gasoline will flow under the suction of the vacuum being created in the vessel 7' from the gasoline tank 12 through the supply pipe 15' into the left hand vessel 7'. If the operator of the apparatus should fail to move the handle 66 to its upright neutral or intermediate position by the time the gasoline flowing into the vessel 7' has reached a level equal to the height of the overflow pipe 19', the float valve 86' will be floated and the communication of the pipe 79' with the vessel 7' will be thereby automatically closed.

After the right hand measuring vessel has been emptied and the left hand vessel has been filled, the handle 66 should be brought into its upright neutral or intermediate position. In this position of the handle 66, the valve plate 56 will be positioned so that the vented passage 59 registers with the orifices 54 and 54' and air will be admitted to the measuring vessels. Admission of air into the vessel 7' at this time will cause the float valve 86' to drop and all gasoline above the level of the upper end of the overflow pipe 19' will pass into said pipe 19', through the same, into the pipe 20' into the supply pipe 15' and thence back into the storage tank 12. It will thus be seen that the measuring of the gasoline is entirely automatic and is not variable for different operations of the apparatus.

The left hand measuring vessel 7' being filled, should it be desired to have its contents discharged, it is only necessary to move the handle 66 to the left until the lug 67 engages the right hand edge of the stop 68. The position of the valve plates 41 and 56 will in this position of the handle be the reverse of their positions when the handle was in its right hand position. This new position of the valve plate 56 is indicated in Fig. 12 of the drawings and from this it will be seen that the passage 58 then connects the pipes 78 and 79 into communication with each other so that air will be exhausted from the vessel 7 and that the passage 59 will be opened to communication with the pipe 79' so that the vessel 7' will be vented. At the same time, the valve plate 41 will be positioned so that its passage 42 will register with the passage 25' in the partition 23 and communication will be established between the outlet of the vessel 7' and the delivery hose 81 through the medium of the opening 16', nipple 17', casting 18', nipple 80', opening 24', passage 25', passage 42, chamber 27, and opening 29. After the right hand measuring vessel 7 has been thus filled and the left hand measuring vessel 7' has been thus emptied, the handle 66 should be brought to its upright neutral or intermediate position so that the right hand vessel 7 may be vented and the excess liquid may overflow back into the storage tank in the manner described in connection with the overflow operation of the left hand measuring vessel 7'.

It is to be understood that when no gasoline is to be dispensed by way of the delivery hose 81, the handle 66 should be brought to its upright neutral or intermediate position. With the handle in this position and the valve plates 41 and 56 in their corresponding neutral or intermediate positions, should operation of the device be discontinued for a time such as at night, the door 3 should be closed and locked in any suitable manner to provide against theft of gasoline and also against tampering of the apparatus by unauthorized persons. Upon movement of the door 3 to its closed position, the link 91 will be moved rearwardly causing the rock shaft 87 to be rocked, and a turning movement imparted to the stem 74 and valve plate 70. This new position of the valve plate 70 causes the passages or openings 71 therein to register with the passages 25 and 25' in the partition 23, which obviously opens the outlets of the measuring vessels 7 and 7' into communication with the pipe 82 and permits whichever of said vessels that is filled with gasoline to have its contents conducted back into the pipe 15, through the latter and back into the storage tank 12. As soon as the door 3 is again opened, the valve plate 70 will be moved to the position wherein the passages 25 and 25' will be closed to communication with the pipe 82.

From the foregoing description, taken in connection with the accompanying drawings, the construction, use and operation of the apparatus will be readily understood. It will be seen that the apparatus is entirely automatic and is extremely simple to operate since the filling and emptying valves are connected to operate in unison. A very important feature of the apparatus, is the novel construction by which the gasoline is accurately measured in either of the measuring vessels and the elimination of the possibility of leakage of the gasoline from the vessels after it has once thus been measured.

Although the construction and arrangement of the various parts of the apparatus are preferred to be in accordance with the above description and with the accompanying drawngs, yet modification may well be made without departing from the principle of the invention, and hence it is to be understood that this is permitted within the scope of the appended clams.

What is claimed is:

1. In an apparatus of the class described, the combination of a storage tank, a pair of measuring vessels, means for causing liquid to flow from said tank to said vessels, means for conducting liquid in said vessels in excess of a predetermined amount back into said tank, and means operable to alternate positions for simultaneously allowing one vessel to empty and the first named means to operate to fill the other vessel and at the same time preventing said excess liquid from passing out of the vessel being filled through the second named means, the last named means being also operable to another position for permitting said excess liquid to pass out of either vessel through the second named means and at the same time preventing filling and emptying of said vessels.

2. In an apparatus of the class described, the combination of a storage tank, a pair of measuring vessels, means for causing liquid to flow from said tank to said vessels, means for conducting liquid in said vessels in excess of a predetermined amount back into said tank, and means operable to alternate positions for venting one vessel and allowing it to empty and simultaneously permitting the first named means to operate to fill the other vessel and at the same time preventing said excess liquid from passing out of the vessel being filled through the second named means, the last named means being also operable to another position for venting said vessels and permitting said excess liquid to pass out of either vessel through the second named means and at the same time preventing filling and emptying of said vessels.

3. In an apparatus of the class described, the combination of a storage tank, a pair of measuring vessels, suction means for causing liquid to flow from said tank to said vessels, and means operable as a unit to alternate positions for venting and causing one vessel to empty and the aforesaid means to operate to simultaneously fill the other vessel.

4. In an apparatus of the class described, the combination of a storage tank, a pair of measuring vessels, suction means for causing liquid to flow from said tank to said vessels, means conducting liquid in said vessels in excess of a predetermined amount back into said tank, and means operable to alternate positions for venting and causing one vessel to empty and the aforesaid means to operate to simultaneously fill the other vessel, the last defined means being operable to a neutral position wherein it causes said vessels to be vented to permit said excess liquid to pass out of either vessel.

5. In an apparatus of the class described, the combination of a storage tank, a pair of measuring vessels, suction means for causing liquid to flow from said tank to said vessels, means conducting liquid in said vessels in excess of a predetermined amount back into said tank, and means operable to alternate positions for venting and causing one vessel to empty and the aforesaid means to operate to simultaneously fill the other vessel, the last defined means preventing both vessels from emptying simultaneously and said suction means from operating to fill both vessels simultaneously, and said last defined means being operable to a neutral position wherein it causes said vessels to be vented to permit said excess liquid to pass out of either vessel.

6. In an apparatus of the class described, the combination of a storage tank, a pair of measuring vessels, suction means for causing liquid to flow from said tank to said vessels, means conducting liquid in said vessels in excess of a predetermined amount back into said tank, and means operable to alternate positions for venting and causing one vessel to empty and the aforesaid means to operate to simultaneously fill the other vessel, the last defined means being operable to a neutral position wherein it causes said vessels to be vented to permit said excess liquid to pass out of either vessel, and said last defined means being operable as a single unit.

7. In an apparatus of the class described, the combination of a pair of measuring vessels provided with outlets, a storage tank for supplying said vessels, suction means for causing liquid to flow from said tank to said vessels, means conducting liquid in said vessels in excess of a predetermined amount back into said tank, combined suction and vent pipes leading into said vessels, and valve mechanism disposed in the outlets of said vessels and interposed between said pipes and said suction means, said valve mechanism being operable as a unit to alternate positions to vent one vessel by way of one of said pipes and open its outlet and to simultaneously open the other pipe leading into the other vessel into communication with said suction means, said valve mechanism being also operable to a neutral position, wherein it causes both of said vessels to be vented by way of said pipes to permit said excess liquid to pass out of either vessel.

8. In an apparatus of the class described, the combination of a pair of measuring vessels provided with outlets, a storage tank for supplying said vessels, suction means for causing liquid to flow from said tank into said vessels, means conducting liquid in said vessels in excess of a predetermined amount back into said tank, combined suction and vent pipes leading into said vessels, a delivery hose, a two-way valve interposed between said hose and the outlets of said vessels and being selectively operable to alternate positions to open the outlet of one vessel into communication with said hose, said two-way valve being also operable to a neutral position wherein the outlets of both vessels are closed, a valve interposed between said pipes and said suction means and being operable as a unit with said two-way valve to alternate positions to connect the pipe leading to the other vessel into communication with said suction means, the last defined valve being provided with an air vent movable to alternate positions into communication with the pipe leading into the first vessel, and said last defined valve being operable to a neutral position wherein said air vent is opened into communication with the pipes leading to both vessels.

9. In an apparatus of the class described, the combination of a storage tank, a pair of measuring vessels, means for causing liquid to flow from said tank to said vessels, a delivery hose, valve mechanism operable alternately as a single unit for simultaneously causing one vessel to empty by way of said hose and said means to operate to fill the other vessel and being operable to a neutral position wherein neither vessel is permitted to empty by way of said hose, valve mechanism for causing the liquid in said vessels to be drained back into said tank, a single casing for enclosing both of said valve mechanisms, and means for operating the last defined mechanism independently of the first defined mechanism.

10. In an apparatus of the class described, the combination of a storage tank, a pair of measuring vessels, means for causing liquid to flow from said tank to said vessels, a delivery hose, valve mechanism operable alternately as a single unit for simultaneously causing one vessel to empty by way of said hose and said means to operate to fill the other vessel and being operable to a neutral position wherein neither vessel is permitted to empty by way of said hose, means whereby the liquid in said vessels may be conveyed back into said tank, valve mechanism associated with the last defined means and being operable to alternate positions to permit or prevent drainage of said vessels by way of the latter, a single casing enclosing both of said valve mechanisms, a housing enclosing parts of the apparatus including said valve mechanisms and having a movable door, and means operatively connecting the last defined valve mechanism with said door.

11. In an apparatus of the class described, the combination of a storage tank, a pair of measuring vessels provided with outlets, means for causing liquid to flow from said tank to said vessels, a delivery hose, means whereby liquid in said vessels may be drained back into said tank, valve mechanism operable to alternate positions to alternately open said outlets into communication with said hose and being operable to a neutral position wherein neither outlet is opened into communication with said hose, valve mechanism operable to alternate positions to alternately open and close said outlets into communication with the last defined means, a single casing enclosing both of said valve mechanisms, and means for operating the last defined valve mechanism independently of the first defined valve mechanism.

12. In an apparatus of the class described, the combination of a storage tank, a pair of measuring vessels, means for causing liquid to flow from said tank to said vessels, a valve casing provided with two chambers, outlets for said vessels leading to said casing at points adjacent to both of said chambers, a delivery hose leading from one chamber, a drain pipe communicating with the other chamber for carrying liquid back into said tank, a valve disposed in the first chamber and operable to alternate positions to alternately open said outlets into communication with said hose and being operable to a neutral position wherein neither outlet is opened into communication with said hose, a valve disposed in said other chamber and operable to alternate positions to alternately open and close said outlets into communication with said drain pipe, and means for operating the last defined valve independently of the first defined valve.

13. In an apparatus of the class described, the combination of a storage tank, a pair of measuring vessels, means for causing liquid to flow from said tank to said vessels, a valve casing divided intermediate of its ends into two chambers, outlets for said vessels leading into the intermediate portion of said casing and communicating with both of said chambers, a delivery hose leading from one chamber, a drain pipe communicating with the other chamber for carrying liquid back into said tank, a valve disposed in the first chamber and operable to alternate positions to alternately open said outlets into communication with said hose and being operable to a neutral position wherein neither outlet is open into communication with said hose, a valve disposed in the other chamber and operable to alternate positions to alternately open and close said outlets into communication with said drain pipe, and means for operating the last defined valve independently of the first defined valve.

14. In an apparatus of the class described, the combination of a storage tank, a pair of measuring vessels provided with outlets, means for causing liquid to flow from said tank to said vessels, means for conducting liquid in excess of a predetermined amount back into said tank, vent pipes leading into said vessels, valve mechanism disposed in the outlets of said vessels and in said vent pipes and being operable as a unit to alternate positions to vent one vessel by way of one of said pipes and open its outlet and to simultaneously permit the first named means to operate to fill the other vessel, said valve mechanism being also operable to a neutral position wherein it causes both of said vessels to be vented by way of said pipes to permit said excess liquid to pass out of either vessel through the second named means, a drain pipe for conducting the liquid in said vessels back into said tank, and a valve interposed between the outlets of said vessels and said drain pipe and being operable to alternate positions to alternately open and close said outlets into communication with said drain pipe, and means for operating said valve independently of said valve mechanism.

15. In a valve mechanism of the class described, the combination of a casing having a chamber into which lead a pair of induction openings and an eduction opening, and being provided independent of said chamber and said openings with two sets of companion ports, a valve disposed in said chamber and being operable to alternate positions to alternately establish communication between one induction opening and said eduction opening and being also operable to a neutral position wherein both induction openings are closed, and a member provided with a connecting passage and a vent passage and being operable as a unit with said valve to alternate positions to alternately connect the ports of one of said sets together by way of said connecting passage and at the same time to vent one port of the other set by way of said vent passage, said member also being operable to a neutral position wherein one port of each set is vented by way of said vent passage.

16. In a valve mechanism of the class described, the combination of a casing having a chamber into which a pair of induction openings and an eduction opening lead and being provided independent of said chamber and said openings with two sets of companion ports, a valve disposed in said chamber and being operable in opposite directions to alternately establish communication between one induction opening and said eduction opening and also being operable to an intermediate position wherein both induction openings are closed, and a member provided with a connecting passage and a vent passage and being operable as a unit with said valve in opposite directions to alternately connect the ports of one of said sets together by way of said connecting passage and at the same time to vent one port of the other set by way of said vent passage, said member being also operable to an intermediate position wherein one port of each set is vented by way of said vent passage.

17. In a valve mechanism of the class described, the combination of a casing having a chamber into which lead a pair of induction openings and an eduction opening and being provided independent of said chamber and said openings with two sets of companion ports, a valve turnably mounted in said chamber and being movable in opposite directions to alternately establish communication between one induction opening and said eduction opening and being operable to an intermediate position wherein both induction openings are closed, and a member provided with a connecting passage and a vent passage and being turnable as a unit with said valve in opposite directions to alternately connect the ports of one of said sets together by way of said connecting passage and at the same time to vent one port of the other set by way of said vent passage, said member being operable to an intermediate position wherein one port of each set is vented by way of said vent passage.

18. In a valve mechanism of the class described, the combination of a casing having a chamber into which lead a pair of induction openings and an eduction opening, one end of said casing being provided independent of said chamber and said openings with two sets of companion pipe receiving ports, a valve turnably mounted in said chamber and being movable in opposite directions to alternately establish communication between one induction opening and said eduction opening and being operable to an intermediate position wherein both induction openings are closed, a plate bearing against said end of said casing and provided on its inner side with a connecting passage and a vented passage, and being turnable in opposite directions to alternately connect the ports of one of said sets together by way of said connecting passage and at the same time to vent one port of the other set by way of said vented passage, said member being operable to an intermediate position wherein one port of each set is vented by way of said vented passage, and means for connecting said plate to said valve to operate in unison therewith.

19. In a valve mechanism of the class described, the combination of a casing having a chamber into which lead a pair of induction openings and an eduction opening, one end portion of said casing being provided independent of said chamber with two sets of laterally extending companion pipe receiving ports having outwardly longitudinally extending orifices, a valve turnably mounted in said chamber and being movable in opposite directions to alternately establish communication between one induction opening and said eduction opening and being operable to an intermediate position wherein both induction openings are closed, a plate mounted to bear against said end portion of said casing and provided on its inner side with an arcuate connecting passage and an arcuate vented passage, and being turnable in opposite directions to alternately cause said connecting passage to register with orifices of the ports of one set and at the same time to cause said vented passage to register with an orifice of one port of the other set, said plate being operable to an intermediate position wherein said vented passage registers with an orifice of one port of each set, and means for connecting said plate to said valve to operate in unison therewith.

20. In a valve mechanism of the class described, the combination of a casing having a chamber into which lead a pair of induction openings and an eduction opening, one end portion of said casing being provided independent of said chamber with two sets of laterally extending companion pipe receiving ports having outwardly longitudinally extending orifices which are equal distances from the longitudinal axis of said casing, one of the ports of each set also having additional outwardly longitudinally extending orifices which are spaced radially with respect to the first named orifices, a valve turnably mounted in said chamber and being movable in opposite directions to alternately establish communication between one induction opening and said eduction opening and being operable to an intermediate position wherein both induction openings are closed, a plate mounted to bear against said end portion of said casing and provided on its inner side with an arcuate connecting passage concentric to the longitudinal axis of said casing on a radius equal to the distance which the first defined orifices are from said axis and being also provided with arcuate vented passage concentric to said axis on a radius equal to the distance which the last defined orifices are from said axis, said plate being turnable in opposite directions to alternately cause said connecting passage to register with the first defined orifices of the ports of one set and at the same time to cause said vented passage to register with the last defined orifices of one port of the other set, said plate being operable to an intermediate position wherein said vented passage registers with the last defined orifices of both sets, and means for connecting said plate to said valve to operate in unison therewith.

21. In a valve mechanism of the class described, the combination of a casing provided with a pair of valve seats, a pair of turnable valves seated upon said seats, one of said valves being yieldably seated against its seat, means for turning one valve and including an axial stem, a laterally extending arm carried by said stem, and an eccentrically located member extending from the other valve in substantially parallel relation to said stem and having a slidable connection with said arm.

22. In a valve mechanism of the class described, the combination of a casing provided with a valve seat on the interior thereof and another valve seat on the exterior thereof, a pair of turnable valve plates seated upon said seats, one of said plates being yieldably seated, a stem connected to the interior valve plate for turning the same, said stem extending to the exterior of said casing, and means connecting the exterior valve plate to said stem to cause said exterior valve plate to be turned in unison with the interior valve plate, said means permitting longitudinal yielding of the one valve plate without unseating the other.

23. In a valve mechanism of the class described, the combination of a casing provided with a valve seat on the interior thereof and another valve seat on the exterior thereof, a pair of turnable valve plates seated upon said seats, the interior valve plate being yieldably seated, an operating stem connected to the interior valve plate and being adapted to yield therewith, said stem extending through a wall of said casing and being turnably and slidably mounted in said wall, and means connecting the exterior valve plate to said stem to cause said exterior valve plate to be turned in unison with the interior valve plate, said means permitting said stem to yield longitudinally without causing said exterior valve plate to unseat.

24. In a valve mechanism of the class described, the combination of a casing having a chamber provided at one end with an interior valve seat and at the other end with an exterior valve seat, turnable valve plates seated upon said seats, an operating stem connected to the interior valve plate, said stem extending through said other end of said chamber and being turnably and slidably mounted therein, spring means interposed between said other end of said chamber and said valve plates to yieldably maintain them seated against their respective seats, and means connecting the exterior valve plate to said stem to cause said exterior valve plate to be turned in unison with the interior valve plate, said means permitting said stem to yield longitudinally without causing said exterior valve plate to unseat.

25. In a valve mechanism of the class described, the combination of a casing having a chamber provided at one end with an interior valve seat and at the other end with an exterior valve seat, a plug carried by said other end of said casing and adjustable longitudinally therewith, turnable valve plates seated upon said seats, an operating stem carried by the interior valve plate, said stem extending through said plug and being turnably and slidably mounted therein, a collar carried by said plug on the exterior of said chamber and being mounted for longitudinal adjustment on said plug, spring means interposed between said plug and interior valve plate to maintain the latter yieldably seated against its seat, spring means interposed between said collar and the exterior valve plate to maintain the latter seated against its seat, and means connecting the exterior valve plate to said stem to cause said exterior valve plate to be turned in unison with the interior valve plate, the last defined means permitting relative longitudinal yielding of said stem and the exterior valve plate.

26. In a valve mechanism of the class described, the combination of a casing having a chamber provided at one end with an interior valve seat and at the other end with an exterior valve seat, a plug threaded in said other end of said chamber and having a portion extending outwardly therebeyond, a collar threaded upon said outwardly extending portion of said plug, turnable valve plates seated upon said seats, an operating stem carried by the interior valve plate, said stem extending through said plug and being snugly turnably and slidably mounted therein, spring means interposed between said plug and the interior valve plate to maintain the latter yieldably seated against its seat, spring means interposed between said collar and the exterior valve plate to maintain the latter seated against its seat, and means connecting the exterior valve plate to said stem to cause said exterior valve plate to be turned in unison with the interior valve plate, the last defined means permitting relative yielding of said stem and the exterior valve plate.

27. In a valve mechanism of the class described, the combination of a casing having two chambers into which lead a common induction opening, said chambers being provided with individual eduction openings, and independently operable valves mounted in said casing for controlling the communication of said induction opening with said chambers.

28. In a valve mechanism of the class described, the combination of a casing having two chambers into which lead a pair of common induction openings, said chambers being provided with individual eduction openings, a valve turnably mounted in one chamber and provided with a passage leading into the latter, said valve being operable to alternate positions to selectively cause said passage to register with one of said induction openings, and another valve turnably mounted in the other chamber and provided with a passage leading into said other chamber, said other valve being operable to alternate positions for controlling the communication of its passage with said induction openings.

29. In a valve mechanism of the class described, the combination of a casing provided intermediate of its ends with a transverse partition dividing it into two chambers, said casing having a pair of induction openings leading therein adjacent said partition, said partition being provided with passages leading from said induction openings into said chambers, said chambers being provided with individual eduction openings, and valves mounted in said casing for controlling the communication of said passages with said chambers.

30. In a valve mechanism of the class described, the combination of a casing provided intermediate of its ends with a transverse partition which is cast integral therewith, said casing having a pair of oppositely disposed induction openings leading thereinto at a point adjacent said partition, the latter being provided with passages leading from said induction openings into said chambers, said chambers being provided with individual eduction openings, and valves mounted in said casing for controlling the communication of said passages and induction openings with said chambers.

31. In a valve mechanism of the class described, the combination of a casing having two chambers into which lead a pair of common induction openings and being provided with interior valve seats, said chambers being further provided with individual eduction openings, an exterior valve seat on said casing, independent valves mounted in said chambers and seated upon said interior valve seats for controlling the communication of said induction openings with said chambers, a valve mounted upon said casing and seated upon exterior valve seat, and means operatively connecting said exterior valve to one of the interior valves so as to cause these valves to be operated in unison.

In testimony whereof I have hereunto set my hand.

JOHN A. BRYDEN.